UNITED STATES PATENT OFFICE.

J. BURROWS HYDE, OF NEWARK, NEW JERSEY.

COMPOSITION FOR SUPPORTS IN BLOW-PIPE OPERATIONS.

Specification forming part of Letters Patent No. 30,680, dated November 20, 1860.

*To all whom it may concern:*

Be it known that I, J. BURROWS HYDE, of Newark, county of Essex, and State of New Jersey, have invented a new and Improved Material or Compound Applicable to Certain Heating Purposes; and I do hereby declare that the following is a full and exact description thereof.

Inventors and others using a lamp or gas flame with a blow-pipe for soldering are compelled to place their work upon a piece of charcoal for the double purpose of keeping the work at rest while being heated, as well as for the purpose to absorb heat from the flame which passes the work, and which absorbed heat in turn accelerates the process.

It is very difficult to procure pieces of charcoal except of limited size, and the process of cutting and smoothing not only wastes much material, but it is liable to break and requires binding together by wire. Pumice-stone is often employed in place of the charcoal, and is found to answer therefor in certain cases, but the same objections apply to this as to charcoal.

The article I am about to describe is intended as a substitute for either or both those articles, and in use has been found to possess advantages over both. It can be readily molded into any required size or shape suitable for the kind of work for which it is to be employed. It is compact and fine in texture, and readily receives by abraision or cutting a plane or other surface for holding the work, and retains that surface while in use, unlike charcoal, which is often burned away displacing the work while under the process.

The nature of my invention consists in the manufacture of cakes, or plates, or blocks for surface-heating under the blow-pipe flame from a lamp or gas, and is made of a mixture of charcoal-dust (preferring that from peaty matters) and fine plaster-of-paris, made by water into a thick paste and pressed into molds of proper size and shape. The plaster setting and hardening the cast, gives it under pressure proper tenacity or induration for use.

Silicate of soda, potash, or lime may be mixed with the water to give greater hardness to the material, but for general purposes the silicate may be dispensed with. The proportions I find to answer well are twelve measures of carbon-dust, three measures of plaster, and one and five-eighths measure of water, or water and silicate. Thoroughly incorporate the powders, add the water, mix quickly into paste, and fill into a shell or iron mold and press heavily.

These cakes, which I propose to designate as "alchemist plates," will be found to yield a most intense heat, and the combustion slow. The proportions I do not limit to those above set forth, as they may be varied therefrom.

I claim—

The above-described alchemist-plates, as an article of manufacture, made in the manner and for the purpose set forth.

J. BURROWS HYDE.

Witnesses:
W. W. CARRELL,
SAMUEL H. DORSEY.